(12) United States Patent
Gregg et al.

(10) Patent No.: US 8,452,020 B2
(45) Date of Patent: May 28, 2013

(54) ADJUSTMENT OF ACOUSTIC PROPERTIES BASED ON PROXIMITY DETECTION

(75) Inventors: Justin Gregg, San Francisco, CA (US); Michael M. Lee, San Jose, CA (US); Chad Seguin, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 758 days.

(21) Appl. No.: 12/195,327

(22) Filed: Aug. 20, 2008

(65) Prior Publication Data

US 2010/0046766 A1 Feb. 25, 2010

(51) Int. Cl.
*H04R 29/00* (2006.01)
(52) U.S. Cl.
CPC .................................... *H04R 29/00* (2013.01)
USPC ............................. 381/59; 381/71.6; 381/109
(58) Field of Classification Search
USPC ................... 381/59, 334, 365, 379, 388, 76.1, 381/109; 455/355; 379/388.01
See application file for complete search history.

(56) References Cited

U.S. PATENT DOCUMENTS

| | | | | |
|---|---|---|---|---|
| 5,684,294 | A * | 11/1997 | Kouhi | 250/214 AL |
| 6,819,946 | B2 * | 11/2004 | Hansson | 455/569.1 |
| 2002/0068537 | A1 * | 6/2002 | Shim et al. | 455/177.1 |
| 2002/0086656 | A1 * | 7/2002 | Mattisson | 455/355 |
| 2002/0161577 | A1 * | 10/2002 | Smith | 704/233 |
| 2005/0215296 | A1 * | 9/2005 | Fujihara et al. | 455/575.3 |
| 2006/0093161 | A1 * | 5/2006 | Falcon | 381/104 |
| 2006/0258414 | A1 * | 11/2006 | Vance et al. | 455/575.7 |
| 2007/0202858 | A1 * | 8/2007 | Yu | 455/414.1 |
| 2008/0101589 | A1 * | 5/2008 | Horowitz et al. | 379/388.03 |
| 2009/0015425 | A1 * | 1/2009 | Palmqvist et al. | 340/686.6 |
| 2009/0221262 | A1 * | 9/2009 | Miwa et al. | 455/404.1 |

\* cited by examiner

*Primary Examiner* — Minh-Loan T Tran
*Assistant Examiner* — Fazli Erdem
(74) *Attorney, Agent, or Firm* — Blakely, Sokoloff, Taylor & Zafman LLP

(57) ABSTRACT

One or more acoustic transducers of a device may be adjusted based on automatic detection of device proximity to the user. In a mobile telephone, when the user is using the receiver and holding the telephone against his/her ear, if the telephone detects that the user has moved the telephone further from his/her ear, the telephone will raise the receiver volume. Similarly, if the user is using the speaker, the telephone will adjust the speaker volume as user distance from the telephone changes. In another embodiment the telephone may fade between the receiver and the speaker. Volume is not the only acoustic property that could be adjusted according to user proximity. Frequency response is another property that could be adjusted, such as using appropriate electronic filtering, or by turning on another transducer that is not otherwise being used.

12 Claims, 4 Drawing Sheets

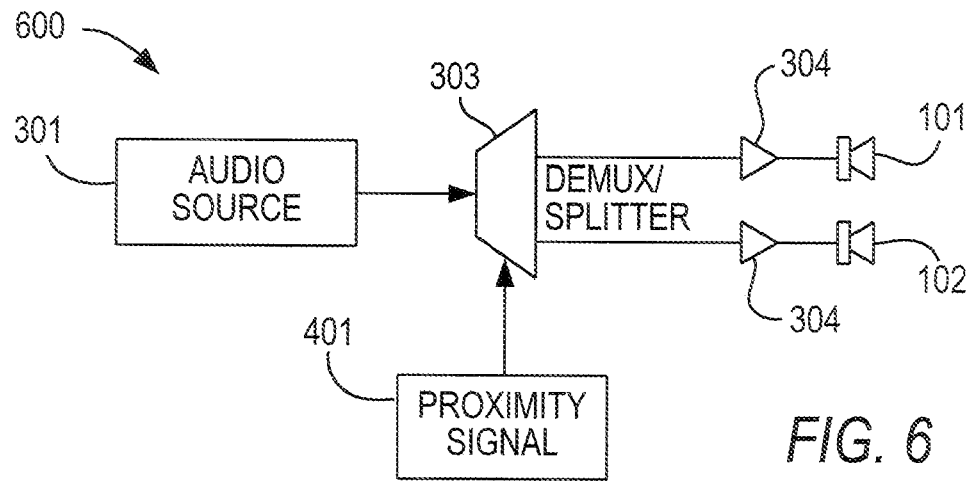
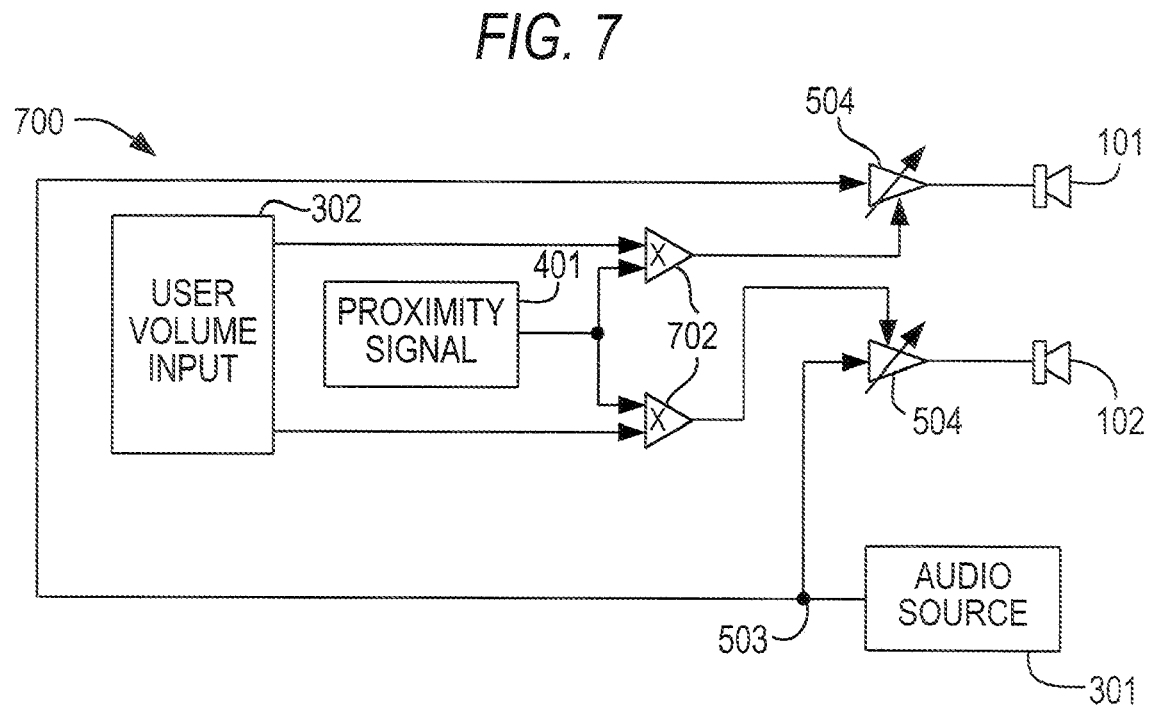

ADJUSTMENT OF ACOUSTIC PROPERTIES BASED ON PROXIMITY DETECTION

BACKGROUND OF THE INVENTION

This invention relates to a device having acoustic transducers that may be adjusted depending on user distance from the device, which may be determined by proximity detection.

Devices that have acoustic transducers may need to adjust those transducers depending on user proximity to the device. For example, in a mobile telephone having both an earpiece speaker (hereinafter referred to as a "receiver") and a speakerphone or hands-free speaker (hereinafter referred to as a "speaker"), the volume of the receiver may need to be adjusted depending on how close the telephone is held to the user's ear. As the user's position changes, the user would have to interact with a volume control, potentially missing part of the conversation while doing so. Similarly, if the user wants to switch between receiver mode and speaker mode (in either direction), the user again would have to interact with an appropriate control, again potentially missing part of the conversation while doing so.

SUMMARY OF THE INVENTION

The present invention relies on automatic detection of device proximity to the user to adjust one or more acoustic transducers. For example, if the device is a mobile telephone, and the user is using the receiver and holding the telephone against his/her ear, if the telephone detects that the user has moved the telephone further from his/her ear, the telephone will raise the receiver volume. Similarly, if the user is using the speaker, the telephone will adjust the speaker volume as user distance from the telephone changes.

In another embodiment the telephone may fade between the receiver and the speaker. In such an embodiment, if the user, e.g., starts with the device near his face, the device could use the receiver output. As the user begins to move the telephone further away, the telephone will detect the decreased proximity and increase the receiver volume. Eventually, as the proximity decreases further, the telephone will switch from the receiver to the speaker, starting out at a lower speaker volume and increasing the speaker volume as the distance increases. The reverse would happen if while in speaker mode the distance to the user decreases.

In a variant of this embodiment, during the switch-over from receiver to speaker or speaker to receiver, there may be a time when both the receiver and the speaker are active. Thus, in the receiver-to-speaker direction, as the receiver reaches its maximum volume and the speaker comes on at a low volume, the receiver may remain on, fading in volume as the speaker volume increases. Similarly, in the speaker-to-receiver direction, as the speaker approaches its minimum volume, the receiver may come on at a low volume before the speaker reaches its minimum volume, with the receiver volume rising to full volume as the speaker reaches its minimum volume and turns off. Receiver volume would then start to fall. Such an embodiment can make the transition appear nearly seamless to the user.

Volume is not the only acoustic property that could be adjusted according to user proximity. Frequency response is another property that could be adjusted, using appropriate electronic filtering or other techniques. Devices that emit sound typically are designed to have a certain acoustic frequency response based on a user holding the device in a specific position relative to the user's ear. If the device is not being held in that position, the frequency response will be affected by the change in, e.g., acoustic resistance or impedance of the air in front of the speaker or other transducer. If it is detected that the distance between the user and the device is changing, the appropriate frequencies could be boosted or deemphasized. Normally, for example, lower audible frequencies are affected more than higher frequencies as a device is moved away from a user, increasing the volume of air in front of the transducer (e.g., speaker or receiver). Thus, if it is detected that the device is being moved away from the user, the lower frequencies could be boosted. Any suitable technique can be used to boost the selected frequencies. For example, in the mobile telephone example where there are both a receiver and a speaker, the necessary frequency boost could be provided by turning on the other transducer that is not otherwise being used.

Therefore, in accordance with the present invention, there is provided an audio device having at least one audio transducer. A proximity detector outputs a proximity signal based on the distance between a user and the audio device. Control circuitry adjusts an acoustic property of at least one of the audio transducers based on the proximity signal.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which:

FIG. 6 is a schematic diagram of circuitry for controlling volume of an audio device according to a third embodiment of the present invention; and FIG. 7 is a schematic diagram of circuitry for controlling volume of an audio device according to a fourth embodiment of the present invention.

DETAILED DESCRIPTION

In accordance with this invention, the acoustic properties of acoustic transducers in a device may be adjusted in the manner described above based on the proximity of the device to a user, or to any other surface that might affect the acoustic impedance at the transducer output. For example, a mobile telephone speaker may perform differently when laid on a table than if held in a user's hand.

There may be several different ways to sense the proximity of the device to a user or other surface. For example, there may be active methods in which the device includes both an emitter and detector of some kind of energy (e.g., infrared light or low-intensity sound waves). By measuring how much of the emitted energy is returned to the detector, and/or how fast it is returned, proximity of the surface that is reflecting the energy can be determined.

There also may be passive methods, which may be particularly well-suited for devices like mobile telephones that have a mode of use in which they are literally up against the user. For such devices, light sensors can be provided on the surface facing the user, and the amount of light reaching the sensors can be used as a measure of how close the device is to the user (e.g., no light means the device is touching the user). Certain devices may be capable of sensing a user's touch (e.g., capacitively or electrostatically), and that touch-sensitivity also could be used to determine proximity. For example, the iPhone® smart telephone, available from Apple Inc., of Cupertino, Calif., has a touch-sensitive screen on its front surface that is normally held against a user's face during telephone conversations. That touch-sensitive screen is provided to allow user inputs to the device, but also could be used to determine, during a conversation or other audio event (such as an audio file playback), how much of the user's skin is in contact with the device, which is an indicator of proximity.

Figure 1:
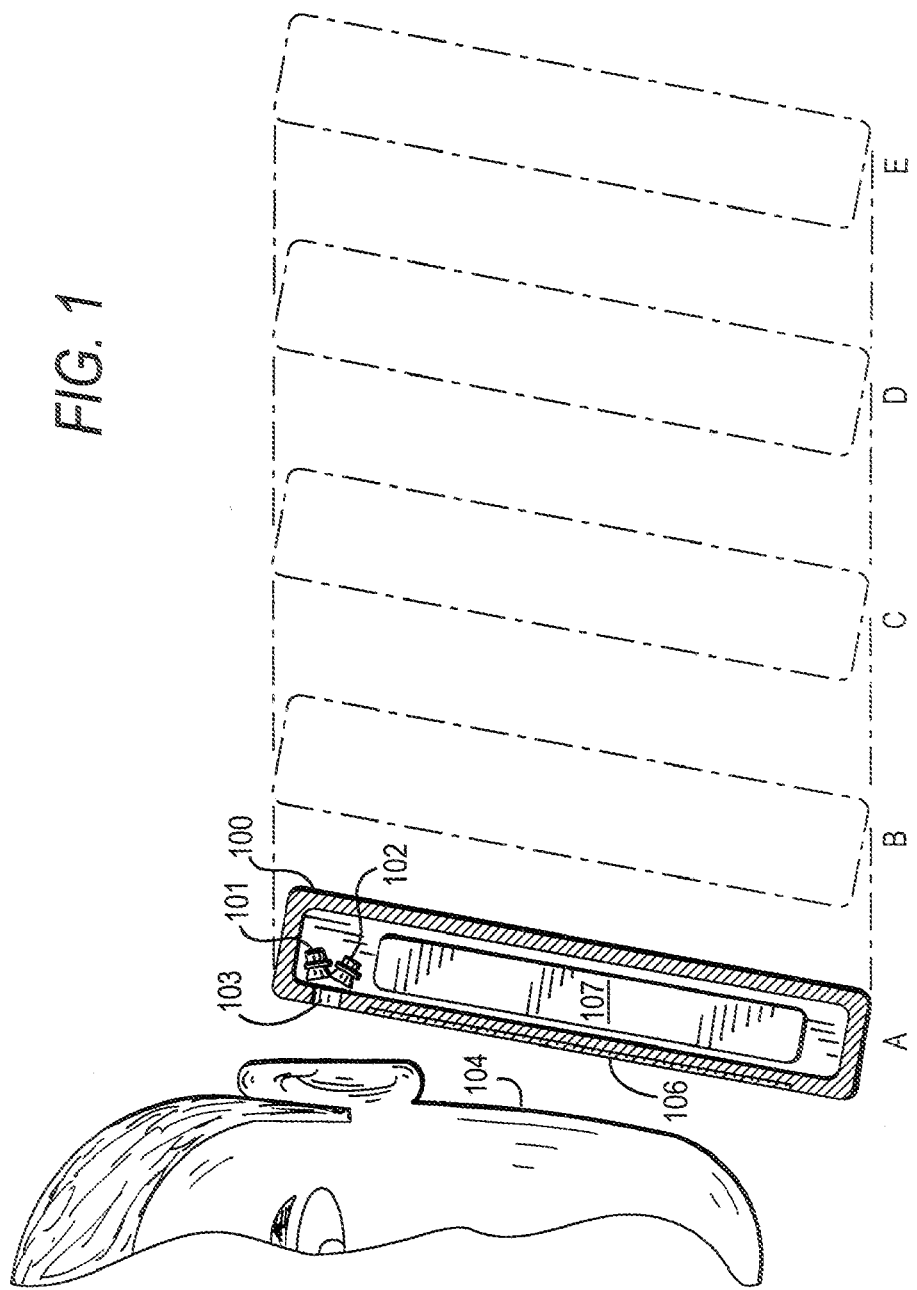
FIG. 1 is a schematic cross-sectional view of a mobile telephone incorporating an embodiment of the present invention, in multiple positions relative to a user's face.
Figure 2:
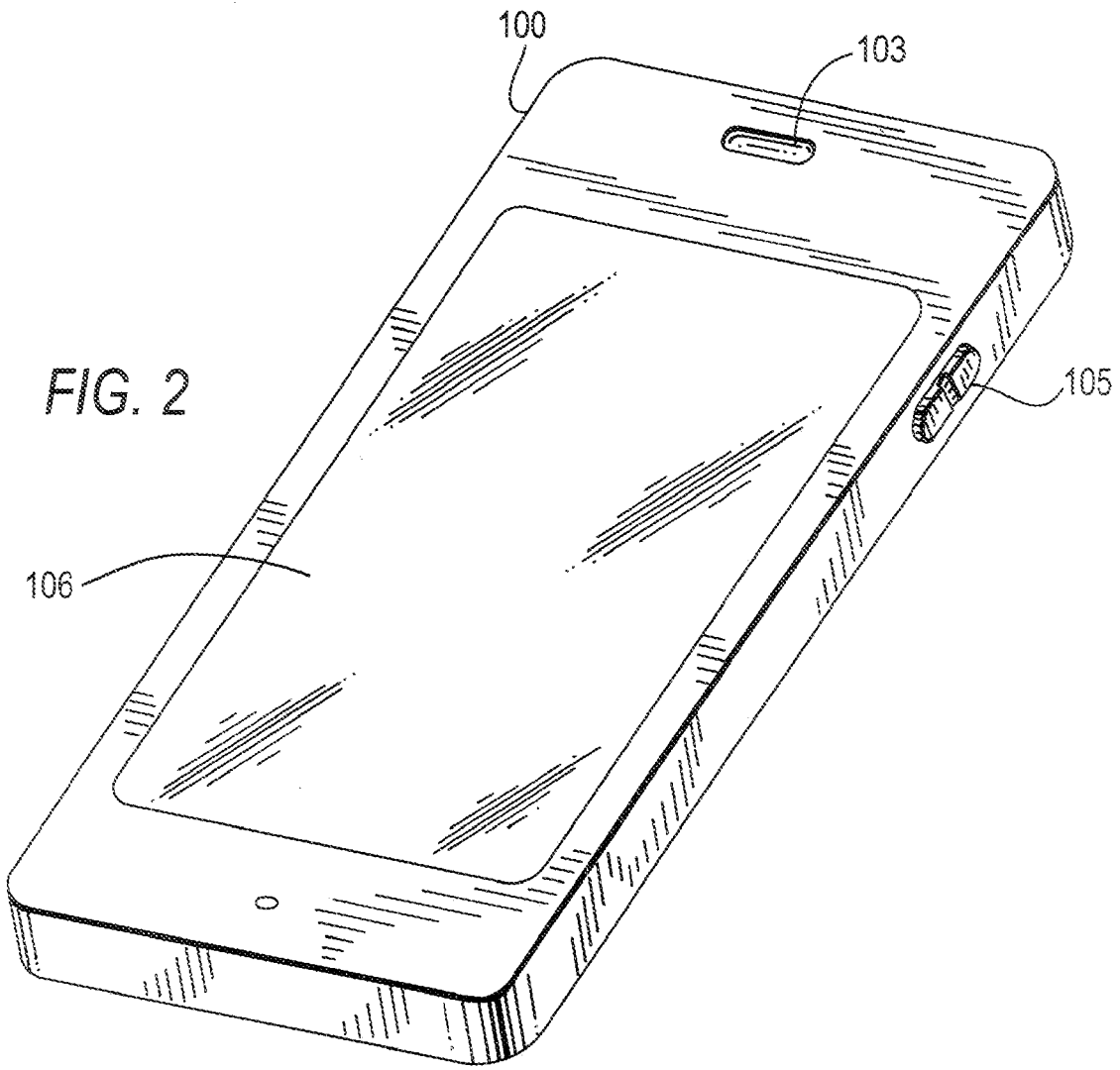
FIG. 2 is a perspective view of the mobile telephone of FIG. 1.

As shown in FIGS. 1 and 2, a mobile telephone 100 may have two loudspeakers or acoustic transducers, serving as receiver 101 and speaker 102. In this particular embodiment, both receiver 101 and speaker 102 share the same acoustic port 103, but the invention also may be used in a device in which the two acoustic transducers have different ports. In addition, the invention may be used in devices, other than mobile telephones, that have one or more acoustic transducers.

Mobile telephone 100 may also have a touch-sensitive screen 106 that may be used as an input/output device, as well as circuitry 107 that may include a radiofrequency transceiver and various control circuits some of which are described in more detail below.

As seen in FIG. 1, mobile telephone 100 when in use in position A may be held against the user's face 104, but also may be held in any one of a number of positions B, C, D, E, etc. (shown in phantom) away from user's face 104. Normally, in position A the user would expect receiver 101 to be active, at a particular volume which may be selectable using, e.g., controls 105. Similarly, in position E the user would expect speaker 102 to be active, at a particular volume, also selectable, suitable for a "handsfree" conversation.

It is a common feature of mobile telephones generally that the user can select different "profiles" of use, in which different default volume levels may be set. The default volume for position A may be stored in a "normal" profile while the default volume for position E may be stored in a "handsfree" or "speakerphone" profile. Thus, when the user changes positions, he/she can simply change profiles without having to hunt for the correct volume setting (although particular circumstances, such as a noisy environment, may require deviating from the preset volume levels). However, it would be cumbersome to have to set so many different profiles, and then change between them, as may be called for by positions B, C, D, etc., and not having those profiles is even more inconvenient as the volume levels must be set manually. And even if there were no intervening positions, just eliminating the need to manually change between the normal and handsfree profile would be a convenience.

As described above, a mobile telephone or other device embodying the present invention would detect the position in which the device is being held—e.g., one of the positions A-E. For position A or E, the telephone would activate the receiver or speaker, respectively, to the level set by the user.

Taking an example in which position A is the initial position, as the user begins to move the device away from his/her face, when the device reaches position B, the receiver will remain active, but the volume will have been increased from the user's preset volume to compensate for the increased distance. The volume might increase stepwise, as different predetermined distances are reached, or continuously once an initial threshold distance is reached. By position D the receiver will have been turned off and the speaker will have been turned on, but not to its full volume, which will be reached at position E. The cutover from receiver to speaker could occur abruptly, or there could be a range of distances, represented by position C, in which both the receiver and speaker are on, with the receiver fading off as the speaker fades on in the direction from position A toward position E, or the speaker fading off as the receiver fades on in the direction from position E toward position A.

In addition, as also stated above, other acoustic properties—e.g., frequency response—could be adjusted according to user proximity. In the case of frequency response, for example, appropriate electronic filtering could be used. Alternatively, in the mobile telephone example of FIGS. 1 and 2 where there are both a receiver 101 and a speaker 102, the necessary frequency boost for one transducer 101, 102 could be provided by turning on the other transducer 102, 101.

Any of various suitable technologies, as described above, may be used to detect the proximity of the user to the device. The proximity detection signals from whatever sensor is used may be used to control the volume, frequency response, or other acoustic property, as described below in connection with FIGS. 3-7.

Figure 3:
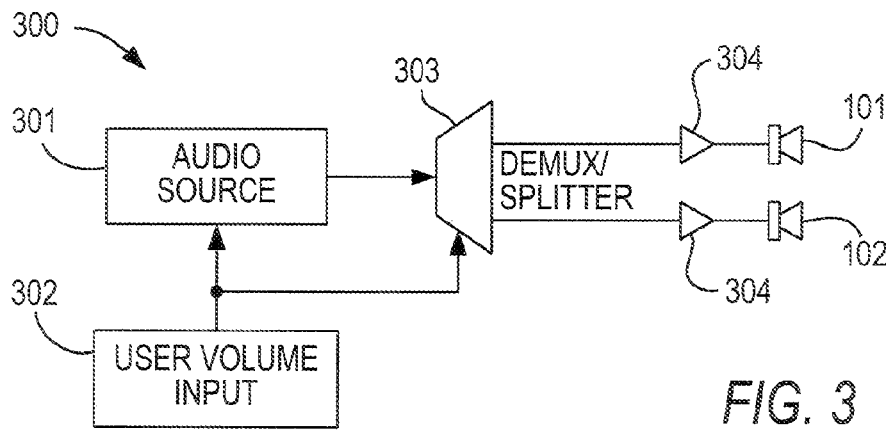
FIG. 3 is a schematic diagram of circuitry for controlling volume of a previously known audio device.

FIG. 3 shows an arrangement 300 whereby the audio source 301 (e.g., the radiofrequency transceiver of mobile telephone 101) may be controlled in the absence of a proximity signal, to control the volume (as an example of any acoustic property that may be controlled) based on a user volume input 302 and to select the transducer (e.g., to select between receiver 101 and speaker 102). In circuitry 300, user input 302 adjusts the volume (or other acoustic property) of audio source 301, which is input to demultiplexer/splitter 303. User input 302 (or a separate user input (not shown)) also controls demultiplexer/splitter 303 to provide the audio source signal to the appropriate one of drivers 304 for driving either receiver 101 or speaker 102.

Figure 4:
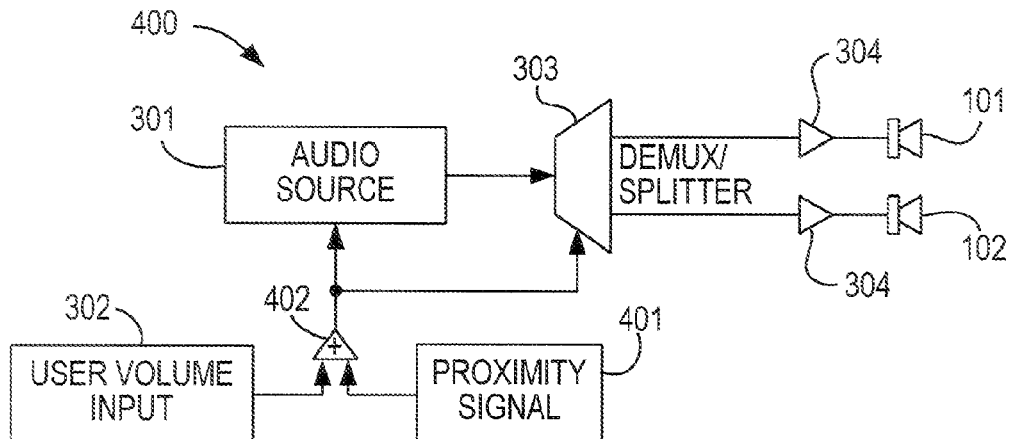
FIG. 4 is a schematic diagram of circuitry for controlling volume of an audio device according to a first embodiment of the present invention.

In a first embodiment according to the invention, shown in FIG. 4, circuitry 400 otherwise is essentially identical to circuitry 300, except that a proximity signal 401 is combined with user input 302 at combining circuits 402, so that proximity signal 401 is taken into account along with user input 302 in setting the acoustic property or properties. In this embodiment, it may not be necessary to control the audio source 301 itself, although the volume or other properties could be controlled there. Thus, audio source 301 in this embodiment could be viewed as an audio generator and adjustment circuit.

Combining circuits 402 can be implemented in different ways. For example, combining circuits 402 may include an adder or multiplier. In one such case, combining circuits 402 may be a linear adder which adds signal 401 (which may be in the range, e.g., of −20 db to +20 dB) as a correction factor to user input 302 (which may be in the range, e.g., of −57 dB to +6 dB). In another example, combining circuits 402 may be a fixed-function (e.g., look-up-table-type) adder that, for each respective predetermined range of user input 302 adds a respective predetermined fraction of signal 401.

In a third example, combining circuits 402 could be implemented with two threshold detection circuits and various digital logic afterwards. The digital logic could include, e.g., an OR-gate whose inputs are the threshold detector outputs and whose output controls audio source 301 to change the volume if either threshold is surpassed. The digital logic also could include, e.g., an AND-gate whose inputs are the threshold detector outputs and whose output controls splitter 303 to switch transducers when both thresholds are crossed. The thresholds of the threshold circuits could be adjusted based on the desired volume level of the transition. Using smoothing and hysteresis in these threshold circuits (e.g. Schmitt triggers) would be desirable to avoid fast back-and-forth switching at intermediate points.

Figure 5:
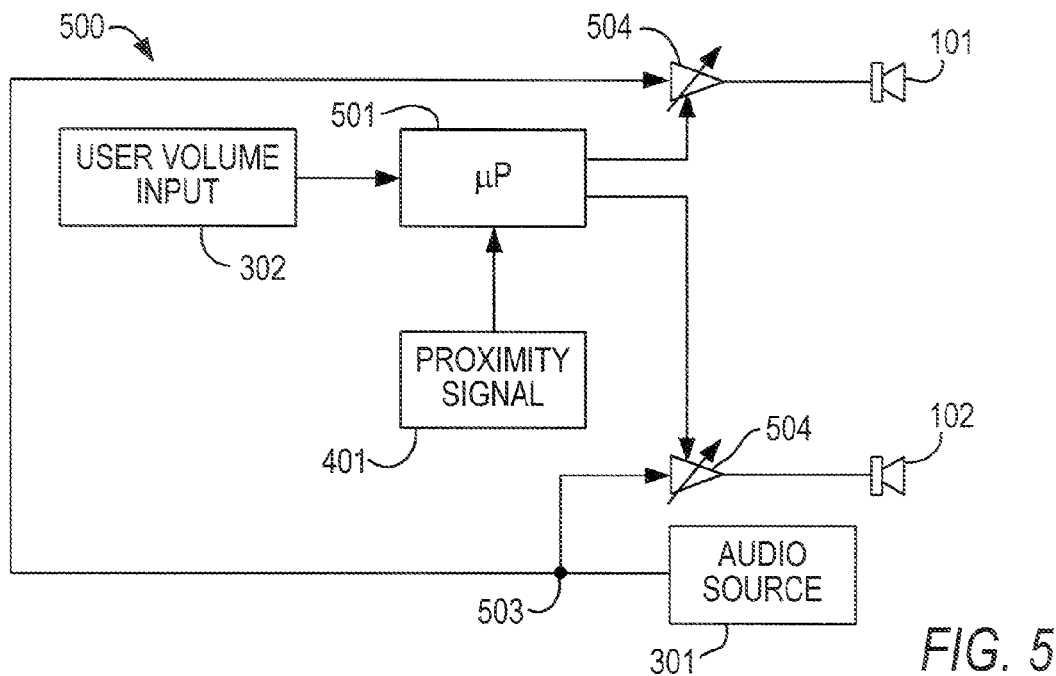
FIG. 5 is a schematic diagram of circuitry for controlling volume of an audio device according to a second embodiment of the present invention.

In a second embodiment of circuitry 500 according to the invention, shown in FIG. 5, each transducer 101, 102 is driven by a respective variable gain amplifier 504, each of which receives the output of audio source 301. A demultiplexer/splitter (not shown) may be provided at node 503 between audio source 301 and amplifiers 504. User input 302 and proximity signal 401 are provided to a microprocessor 501 (or a microprocessor-controlled digital signal processor) which processes signals 302, 401 to determine how to control each of amplifiers 504. Microprocessor 501 thus determines which of transducers 101, 102 is active, and at what volume level, based on signals 302, 401. Unlike circuitry 400 of FIG. 4, in which demultiplexer/splitter 303 can select only one of transducers 101, 102, and in which only one of transducers 101, 102 can be active at any one time, circuitry 500 can activate both transducers 101, 102 at appropriate levels because microprocessor 501 can simultaneously output control signals to each of amplifiers 504. Additionally, this embodiment allows for alteration, e.g. of the frequency content or volume, of the audio signals being sent to each of the transducers.

A third embodiment of circuitry 600 according to the invention, shown in FIG. 6, is similar to circuitry 400 of FIG. 4, except that proximity signal 401 is shown only controlling demultiplexer/splitter 303 to activate either transducer 101, 102. The volume of the selected transducer 101, 102 may be controlled separately (not shown), or may be dependent entirely on the level of the output of audio source 301, however that level may be controlled (not shown).

A fourth embodiment of circuitry 700 according to the invention, shown in FIG. 7, is similar to circuitry 500 of FIG. 5 in that both transducers 101, 102 can be active. In circuitry 700, each transducer 101, 102 is driven by a respective variable gain amplifier 504, each of which receives the output of audio source 301. A demultiplexer/splitter (not shown) may be provided at node 503 between audio source 301 and amplifiers 504. User input 302 and proximity signal 401 are provided to combining circuits 702. The combined control signals adjust the gain of each amplifier 504 to provide the desired output from one or both of transducers 101, 102.

Combining circuits 702 may be similar to combining circuits 402 discussed above. Alternatively, combining circuits 702 could be summing amplifiers and/or difference amplifiers. For example, the receiver volume could be the user selected volume differenced by the proximity, while the speaker volume could be the user selected volume summed with the proximity. The zero point (transducer off) and maximum point (transducer at full volume) for each of the transducers could be adjusted such that the only the receiver is active when the proximity detector shows the device is in contact with the user, and the transition between receiver and speaker mode happens at the appropriate distance. Such adjustment may involve the use of additional offset circuits between the summing/difference amplifiers.

Thus it is seen that a device having one or more acoustic transducers can use automatic detection of device proximity to the user to adjust those one or more acoustic transducers. Although a number of particular embodiments of circuitry for carrying out the invention have been shown, those embodiments are exemplary only, and one of skill in the art could readily identify other circuitry for carrying out the invention. Accordingly, it will be understood that the foregoing is only illustrative of the principles of the invention, and that various modifications can be made by those skilled in the art without departing from the scope and spirit of the invention, and the present invention is limited only by the claims that follow.

What is claimed is:

1. An audio device comprising:
    a plurality of audio transducers, each of which is provided to operate over a different range of values of an acoustic property, said acoustic property comprising a frequency response and said plurality of audio transducers including a receiver speaker and a handsfree speaker;
    a proximity detector that outputs a proximity signal based on a distance between a user and said audio device; and
    control circuitry that performs adjusting of said acoustic property of at least some of said audio transducers based on said proximity signal, wherein said adjusting includes boosting or deemphasizing one or more frequencies based on the distance between the user and said audio device.

2. The audio device of claim 1 wherein said acoustic property further comprises side tone.

3. The audio device of claim 1 wherein said acoustic property further comprises dynamic noise reduction.

4. The audio device of claim 1 wherein said acoustic property further comprises echo.

5. The audio device of claim 1 wherein said device is a mobile telephone.

6. The audio device of claim 5 wherein said acoustic property further comprises echo.

7. The audio device of claim 1 wherein said control circuitry adjusts frequency response of one of said receiver speaker and said handsfree speaker by boosting a selected frequency range.

8. The audio device of claim 7 wherein said control circuitry adjusts frequency response of said one of said receiver speaker and said handsfree speaker by activating another of said receiver speaker and said handsfree speaker in said selected frequency range.

9. An audio device comprising:
    a plurality of audio transducers;
    a proximity detector that outputs a proximity signal based on distance between a user and said audio device; and
    control circuitry that controls a frequency response of at least one of the audio transducers by boosting or deemphasizing certain frequencies based on the proximity signal.

10. The audio device of claim 9 wherein:
    said device is a mobile telephone; and
    said plurality of audio transducers comprises a receiver speaker and a handsfree speaker.

11. A method performed by an audio device, the method comprising:
    determining a proximity between a user and the audio device;
    determining a frequency response of an output of the audio device based on the proximity;
    boosting or deemphasizing one or more frequencies of the output based on the proximity; and
    driving one or more audio transducers with the boosted or deemphasized output, wherein the audio transducers include at least one of a receiver speaker or a handsfree speaker, wherein the determining the proximity, determining the frequency response, the boosting or deemphasizing, and the driving is performed by control circuitry operable to control the audio device.

12. The method of claim 11, wherein the audio device is a mobile telephone.

* * * * *